(12) United States Patent
Shiraishi et al.

(10) Patent No.: US 7,040,763 B2
(45) Date of Patent: May 9, 2006

(54) IMAGE DISPLAY DEVICE

(75) Inventors: Mikio Shiraishi, Yokohama (JP);
Takeshi Katayama, Yokohama (JP);
Keiichiro Tokushige, Fijisawa (JP);
Hideki Okuyama, Souka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/837,400

(22) Filed: Apr. 30, 2004

(65) Prior Publication Data
US 2005/0007558 A1   Jan. 13, 2005

(30) Foreign Application Priority Data
Jul. 7, 2003   (JP) .............................. 2003-192566

(51) Int. Cl.
*G03B 21/16*   (2006.01)
*G03B 21/18*   (2006.01)

(52) U.S. Cl. ......................................... 353/60; 353/61

(58) Field of Classification Search ............... 353/60, 353/61
See application file for complete search history.

(56) References Cited

U.S. PATENT DOCUMENTS

| | | | | |
|---|---|---|---|---|
| 2,562,600 A | * | 7/1951 | Cadwell et al. | 353/61 |
| 4,925,295 A | * | 5/1990 | Ogawa et al. | 353/57 |
| 6,494,581 B1 | * | 12/2002 | Shimizu | 353/61 |
| 6,565,215 B1 | * | 5/2003 | Barrau et al. | 353/119 |

FOREIGN PATENT DOCUMENTS

| | | |
|---|---|---|
| JP | 07-168179 | 7/1995 |
| JP | 10-027518 | 1/1998 |
| JP | 2000-200511 | 7/2000 |
| JP | 2001-125195 | 5/2001 |

* cited by examiner

*Primary Examiner*—Christopher Mahoney
(74) *Attorney, Agent, or Firm*—Townsend and Townsend and Crew LLP

(57) ABSTRACT

A simple cooling construction capable of achieving two functions at a time is to be provided, one function being cooling a lamp as a lighting means and the other function being preventing the scatter of broken pieces of the lamp upon burst of the lamp. An image display device such as an LCD projector has been configured such that cooling air is introduced into the interior of a reflector to cool an lamp means. In this connection, the present invention adopts a net of an expanded metal structure which serves as both means for preventing the scatter of broken pieces of a lamp upon burst of the lamp and an air deflecting plate facing a portion to be cooled. The above two functions can be attained simultaneously by such a simple construction.

4 Claims, 12 Drawing Sheets

A—A

IMAGE DISPLAY DEVICE

CLAIM OF PRIORITY

The present application claims priority from Japanese application serial no. P2003-192566, filed on Jul. 7, 2003, the content of which is hereby incorporated by reference into this application.

BACKGROUND OF THE INVENTION

The present invention relates to an image display device using a light valve element such as a liquid crystal panel to project an image onto a screen. In particular, the present invention relates to such an image display device as an LCD projector or a rear projection type display device.

An image display device such as an LCD projector or a rear projection type display device has been heretofore known. In such an image display device, light emitted from a light source such as an electric bulb is subjected to light intensity modulation for change into light and shade for each pixel in accordance with a video signal by use of a light valve means such as a liquid crystal panel, thereby forming an optical image, and the optical image is projected as a pictorial image on a larger scale onto a screen or the like.

As a light source means such as an electric bulb used in recent display devices, an electric-discharge lamp of a high power type is becoming popular. With an increase in luminance, there is a tendency to using a lamp of a higher power, while a demand exists for the reduction in size of the entire display device. Thus, cooling conditions for the lamp are becoming more and more strict. A reflector means for condensing light emitted from the lamp is disposed around the lamp. The lamp itself may degrade and burst as it is used. Therefore, the lamp is generally used in an enclosed state with reflector means and cover glass.

In such an enclosed state of the lamp, cooling of the lamp may be insufficient. As a countermeasure often adopted, cooling air is introduced from part of a reflector to cool the lamp to an appropriate temperature. In this case, part of the reflector is cut out and cooling air is introduced through the cutout portion. However, for example in the event of burst of the lamp, broken glass pieces of the lamp scatter from the cutout portion. To prevent the scattering, a net-like member is installed in the cutout portion in many cases. There also is known a display device wherein, in order to keep the temperature of a lamp appropriate, a cooling air guide plate is disposed near a cutout portion of a reflector, allowing cooling air to be directed to a desired portion of the lamp for cooling the lamp.

An example of conventional techniques for cooling this type of a lamp and for preventing the scattering of broken glass pieces upon burst of the lamp is a construction wherein cooling air is introduced into a reflection is disclosed, for example, in Japanese Patent Laid-open No. 7-168179. Further, Japanese Patent Laid-open No. 10-27518 discloses a construction wherein a direction of guiding cooling air into a reflector is controlled. Japanese Patent Laid-open No. 2000-200511 discloses separately a construction using a mesh means against bursting of a lamp and a construction of a cooling air guide plate. In particular, Japanese Patent Laid-open No. 2001-125195 discloses a construction wherein both a construction against bursting of a lamp and a construction for cooling air guide are compatible with each other.

SUMMARY OF THE INVENTION

Controlling a cooling air direction is not fully recognized in the conventional art disclosed in Japanese Patent Laid-open No. 7-168179. Preventing the scattering of broken glass pieces of a lamp upon bursting of the lamp is not fully recognized in the conventional art disclosed in Japanese Patent Laid-open No. 10-27518. In the conventional construction disclosed in Japanese Patent Laid-open No. 2000-200511, the adoption of a cooling air guide plate and the prevention of scattering of broken glass pieces are not compatible with each other. In the conventional art disclosed in Japanese Patent Laid-open No. 2001-125195, the entire construction is complicated, that is, the entire construction is a double construction comprising a cooling air guide plate and a scattering preventing mesh means, and this point has not been fully recognized heretofore.

The present invention has been accomplished in view of the above-mentioned problems involved in the conventional art and it is an object of the invention to provide a highly reliable, small-sized image display device at low cost. In particular, the present invention aims at attaining rationalization and improving reliability with respect to a lamp as a light source means and the vicinity thereof.

In the present invention, means for solving the above-mentioned problems adopts a configuration wherein a mesh means is disposed in a cooling air inlet of a reflector means as a light source means, the mesh means comprising plate portions being inclined and forming a plurality of very small blades. The mesh means exhibits a function of changing the direction of air passing through the mesh means. The mesh means serves as both a air guide means and a scattering preventing means. In addition, a direction recognizing means for keeping a mounting direction constant during mounting of the mesh means is provided, permitting an air guide direction to be set positively.

DETAILED DESCRIPTION OF THE PREFERRED EMBODIMENTS

Figure 1A:
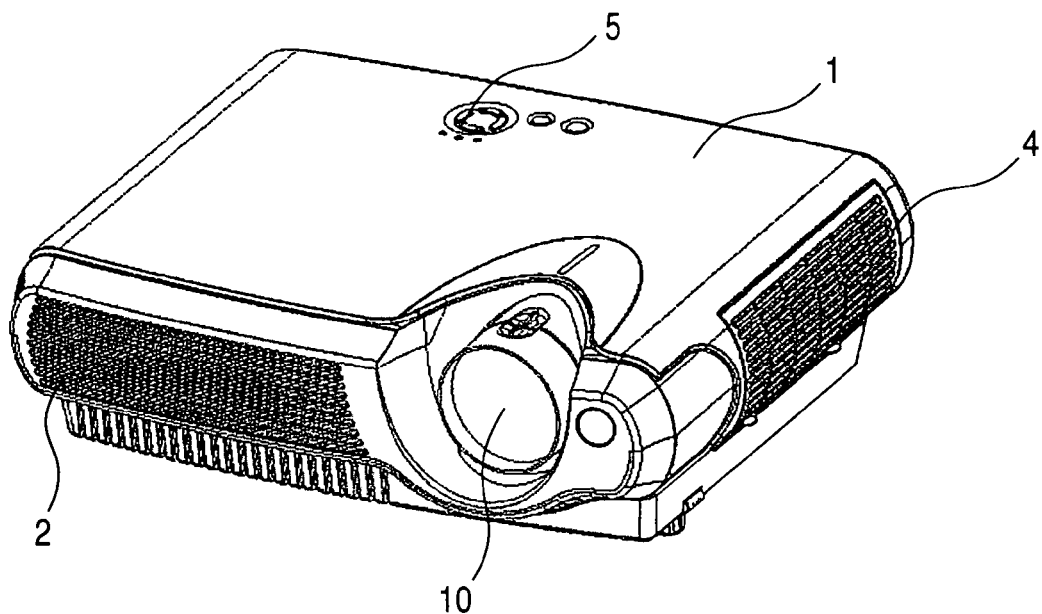
FIGS. 1A and 1B are perspective views showing an appearance of an image display device according to a first embodiment of the present invention.

Embodiments of the present invention will be described in detail hereinunder with reference to the accompanying drawings. In all of the drawings, components having common functions are identified by the same reference numerals and, for avoiding complexity, repeated explanations will be omitted as to components once explained.

FIGS. 1 to 9 are explanatory diagrams of a first embodiment of the present invention and will be explained successively beginning with FIG. 1.

Figure 1B:
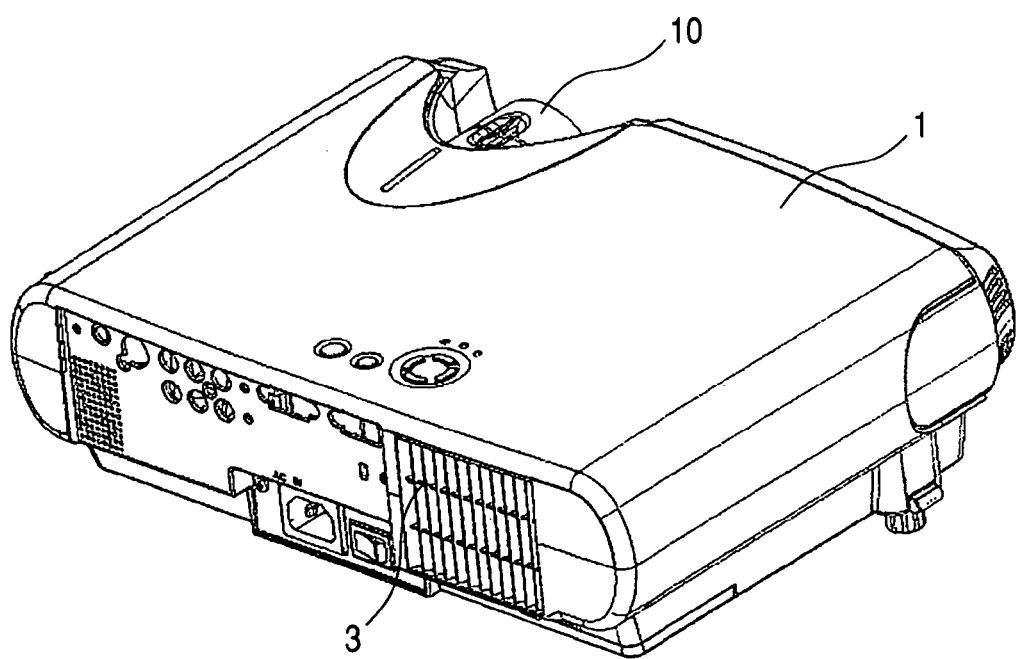

FIGS. 1A and 1B are perspective views showing an appearance of an image display device according to a first embodiment of the present invention, of which FIG. 1A shows a front side and FIG. 1B shows a rear side.

As shown in FIG. 1A, in the image display device of this first embodiment, indicated at 1, an exhaust port 2 faces in the same direction as a projection lens 10, i.e., faces forward, while an intake port 3 is formed on a rear side, as shown in FIG. 1B. Further, an operating button 5 and a panel intake port 4 are disposed so as to face the outside of the device 1.

The image display device 1 is operated by operating the operating button 5 from the exterior of the device. In operation, an image is projected from the projection lens 10 onto a screen, not shown, or the like for display.

Figure 2:
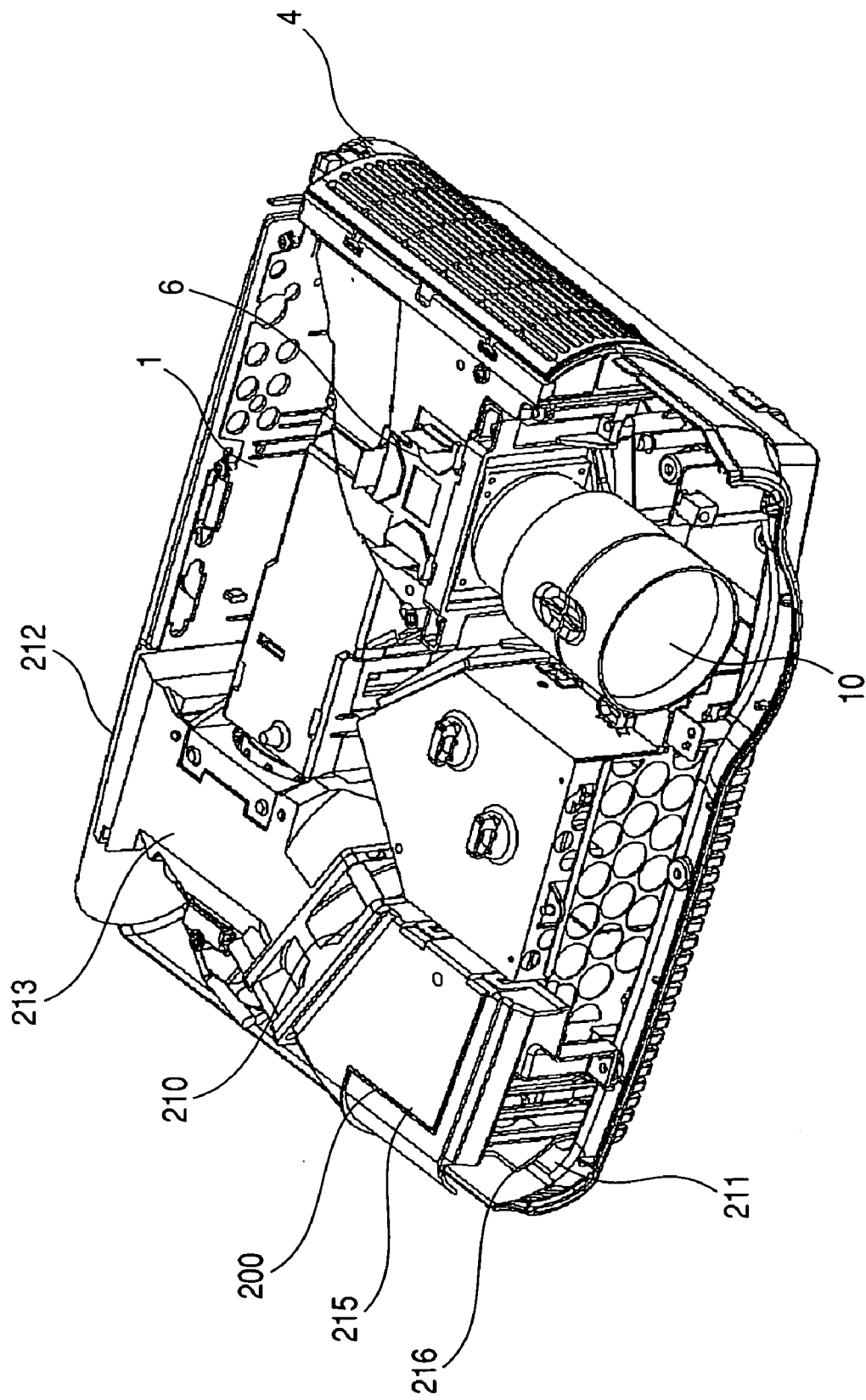
FIG. 2 is a perspective view showing an internal construction of the image display device of the first embodiment.

FIG. 2 is a perspective view showing an interior construction of the image display device 1 illustrated in FIG. 1.

In FIG. 2, a lamp cooling duct 200 as a cooling means for cooling a lamp, or a lighting means, is disposed in the interior of the image display device. The lamp cooling duct 200 is provided on one side with exhaust ducts U 215 and B 216 and on the other side with a lamp duct 213, centered on a fan 210. Further, the lamp cooling duct 200 is provided with a duct exhaust port 211 and a duct intake port 212 at both ends. The duct intake port 212 and the duct exhaust port 211 face the outside air present in the exterior of a case of the device through the intake port 3 and the exhaust port 2, respectively.

A lamp house to be described later, which serves as a lighting means, is disposed below the lamp duct 213 though hidden by the lamp duct. An actual operation of a projector will now be outlined. Light emitted from a lamp (not shown) as a lighting means is modulated by a light valve means (not shown) in the interior of an optical engine portion 6, then is projected through the projection lens 10 as a projection means onto a screen (not shown) installed outside the image display device and is displayed as an image.

Figure 3:
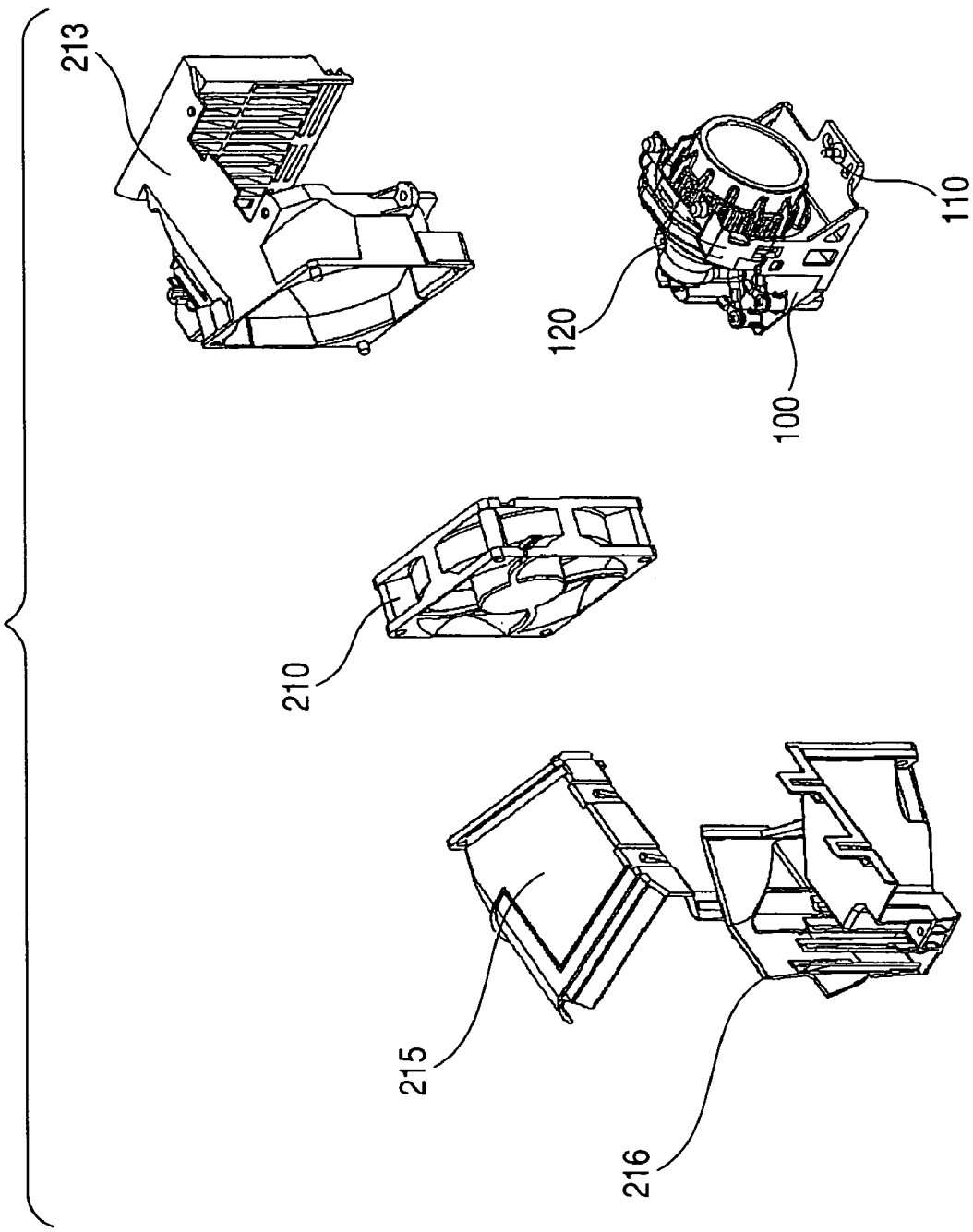
FIG. 3 is an exploded view showing the construction of a cooling portion of a lighting means disposed in the interior of the image display device of the first embodiment.

FIG. 3 is an exploded view showing a detailed construction of the lamp cooling duct 200 used in the first embodiment illustrated in FIG. 1.

In the lamp cooling duct 200, the lamp duct 213 is disposed adjacent the fan 210 on the lamp side. Inside the lamp duct 213 is disposed a lamp house 100 as a lighting means. A lamp 120 held by a lamp holder 110 is installed in the lamp house 100. An outside portion of the lamp duct 213 is formed as the duct intake port 212. The exhaust ducts U 215 and B 216, which constitute an exhaust duct, are disposed on the side opposite to the lamp duct 213 with respect to the fan 210. The portions of the exhaust ducts U 215 and B 216 facing the outside of the image display device constitute the duct exhaust port 211.

As shown in FIGS. 2 and 3, the lamp cooling duct 200 is independent of the other portions of the device.

Figure 4:
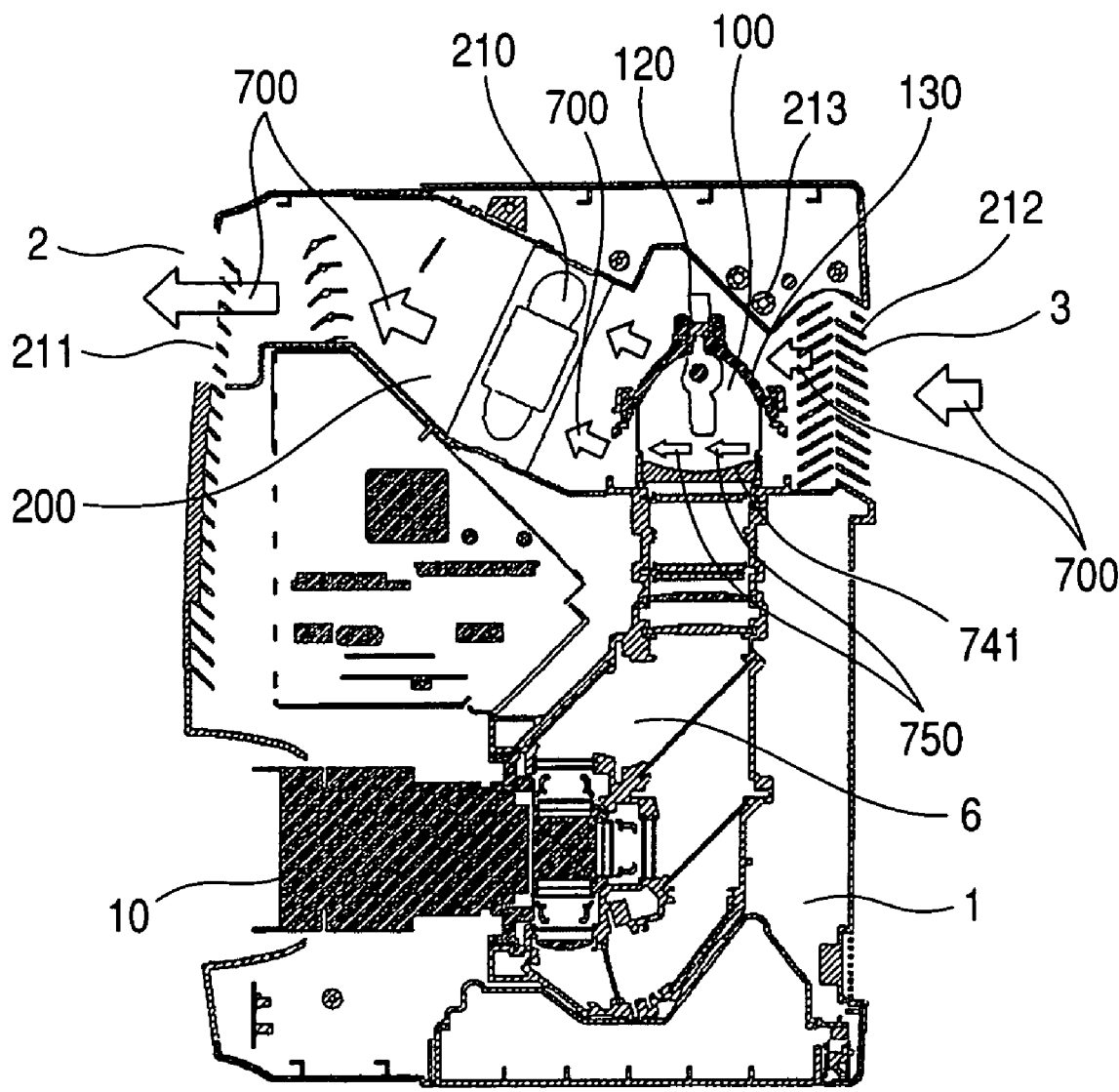
FIG. 4 is a sectional view showing a cooling operation of the lighting means disposed in the interior of the image display device of the first embodiment.

FIG. 4 is a sectional view which outlines a state of operation of the first embodiment illustrated in FIG. 1. In FIG. 4, the fan 210 feeds air forward of the image display device. More specifically, outside air introduced through the intake port 3 from the exterior of the device flows through the duct intake port 212 in the lamp cooling duct 200 as represented by arrows A 700, is heat-exchanged with heat which is generated in the lamp 120 within the lamp duct 213, and then reaches the fan 210. Further, airflow created by the fan 210 passes through the exhaust ducts U 215 and B 216 which constitute the exhaust duct, then passes through the duct exhaust port 211 and is discharged to the exterior of the image display device 1 from the exhaust port 2.

In this case, when the fan 210 disposed downstream of the lamp house 100 is in operation, the fan side of the lamp house 100 becomes negative in pressure and the air pressure becomes low relative to one duct intake port 212. Air is introduced into the lamp house 100 from the positive pressure side, i.e., from the side of the duct intake port 212, through an opening of the reflector 130 and is discharged to the negative pressure side, i.e., the side of the fan 210. Cooling air flows as represented by arrows 750 through the interior of the reflector 130. The lamp 120 is disposed in the interior of the reflector 130. The lamp 120 is heat-exchanged with air flowing as represented by arrows 750 and thus is cooled.

Figure 5:
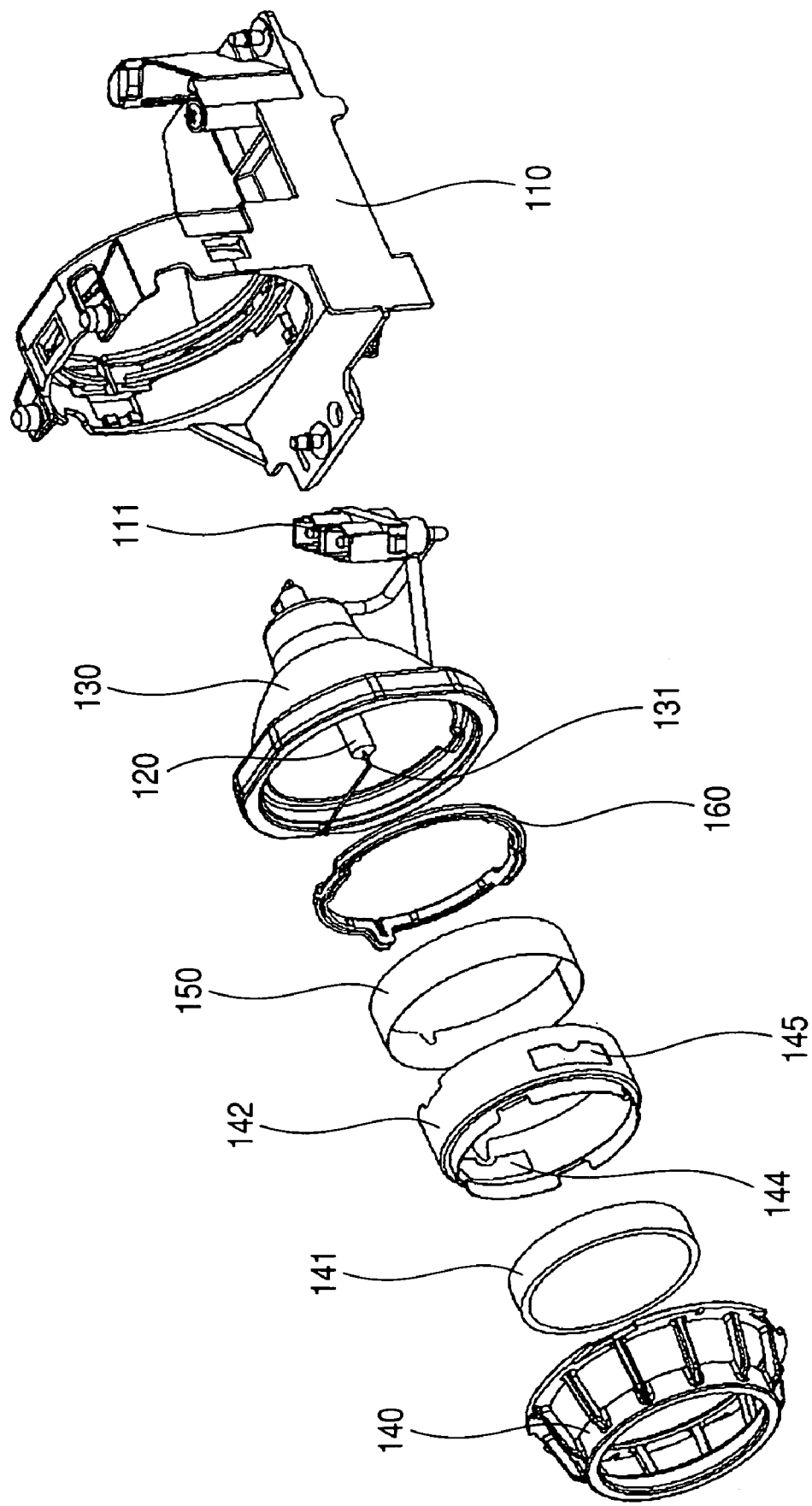
FIG. 5 is an exploded view showing the construction of a lamp house portion of the lighting means in the image display device of the first embodiment.

FIG. 5 is an exploded view showing an internal construction of the lamp house used in the first embodiment illustrated in FIG. 1.

In FIG. 5, the lamp house 100 is composed of various components attached to the lamp holder 110. More specifically, the reflector 130, a connecting cylinder 142 and a cover glass 141 define a closed space so as to surround the lamp 120.

A cap 140 and a mesh holder 10 are disposed around the lamp. The cap 140 functions to hold the whole of the lamp house while the mesh holder 160 holds a mesh 150 against the connecting cylinder 141. Further, the lamp 120 is provided with a lead 131 and a connector 111 for reception and supply of electric power for the lamp house 100.

A description will be given below about the details of the mesh 150 and an opening and its vicinity of the connecting cylinder 142.

Figure 6:
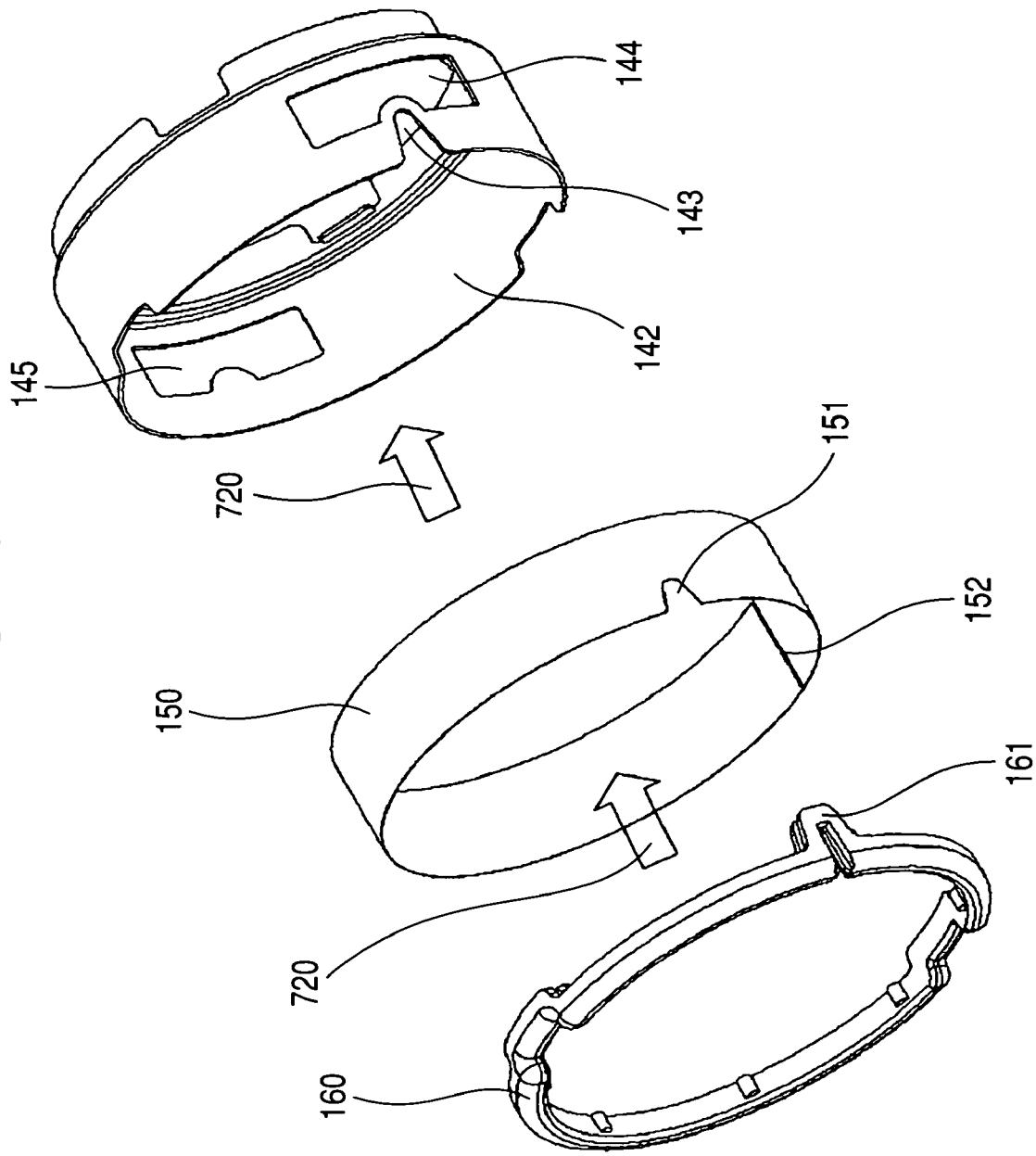
FIG. 6 is an enlarged, exploded view of a mesh portion and the vicinity thereof of the lighting means in the image display device of the first embodiment.

FIG. 6 is an explanatory diagram of the mesh and the vicinity thereof in the lamp house used in the first embodiment illustrated in FIG. 1.

In FIG. 6, the mesh 150 is mounted in the direction of arrows 720 in the interior of the connecting cylinder 142 and further the mesh holder 160 holds the mesh 150 and the connecting cylinder 142 from above. The mesh is a sheet-like member having a large number of fine holes and the details thereof will be described later in connection with FIG. 9. An intake hole 145 and an exhaust hole 144 are formed in the connecting cylinder 142. The mesh 150 is disposed inside the intake hole 145 and exhaust hole 144. Thus, airflow passing through the intake hole 145 and the exhaust hole 144 passes through the mesh 150. The mesh 150 is formed by confronting and attaching ends 152 of a mesh plate in a ring shape. The mesh 150 has a notch 151 for mounting the mesh in a predetermined certain direction. The mesh 150 is mounted while the notch 151 is aligned with a notch 143 formed in the connecting cylinder 142. Further, the mesh holder 160 is mounted in such a manner that a lug 161 thereof gets into those notches. According to such a structure, the mesh 150 can be mounted in a predetermined direction. In addition, it can be mounted in such a manner that blade portions around fine holes formed in the mesh face in a predetermined direction, as will be described later.

Air flows in and out the closed space from and to the exterior through the intake hole 145 and the exhaust hole 144 both formed in the connecting cylinder 142. The mesh 150 is provided inside the intake and exhaust holes 145, 144 and inside the connecting cylinder 142. Thus, air is sure to pass through the holes of the mesh 150 during intake and exhaust of air.

Figure 7:
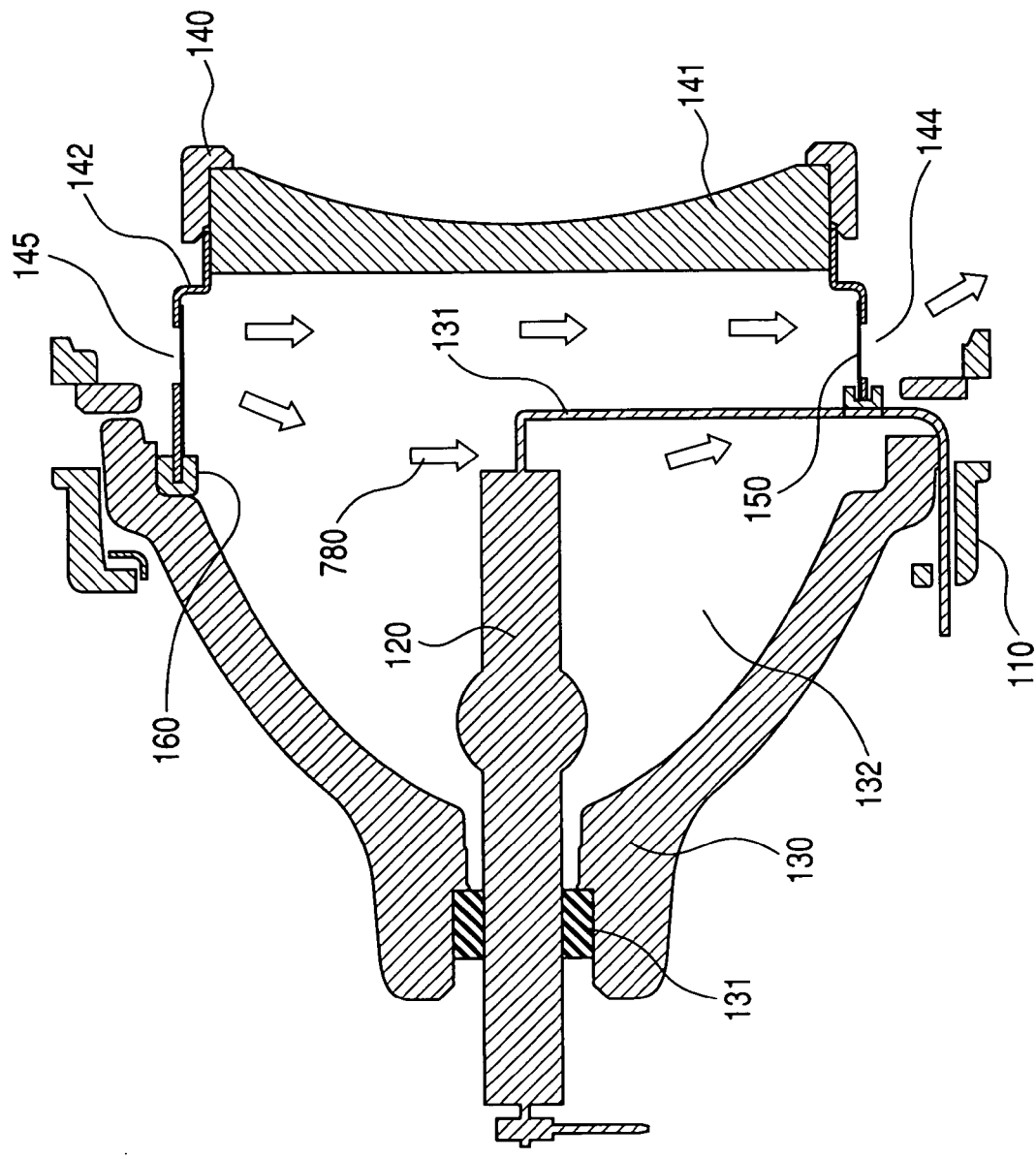
FIG. 7 is a longitudinal sectional view of the lighting means in the image display device of the first embodiment.

FIG. 7 is a longitudinal sectional view of the mesh and the vicinity thereof in the lamp house according to the first embodiment illustrated in FIG. 1.

In FIG. 7, the outside air is introduced into the reflector 130 through the intake hole 145 formed in the connecting cylinder 142, then flows through the mesh 150 and advances toward the interior, indicated at 132, of the reflector. The air thus introduced flows as represented by arrows 780, is heat-exchanged in the vicinity of the lamp 120 to cool the lamp, and then is finally discharged to the exterior of the reflector through the exhaust hole 144. The lamp 120 and the reflector 130 are fixed together through a cement portion 131 positioned at a neck portion.

Figure 8:
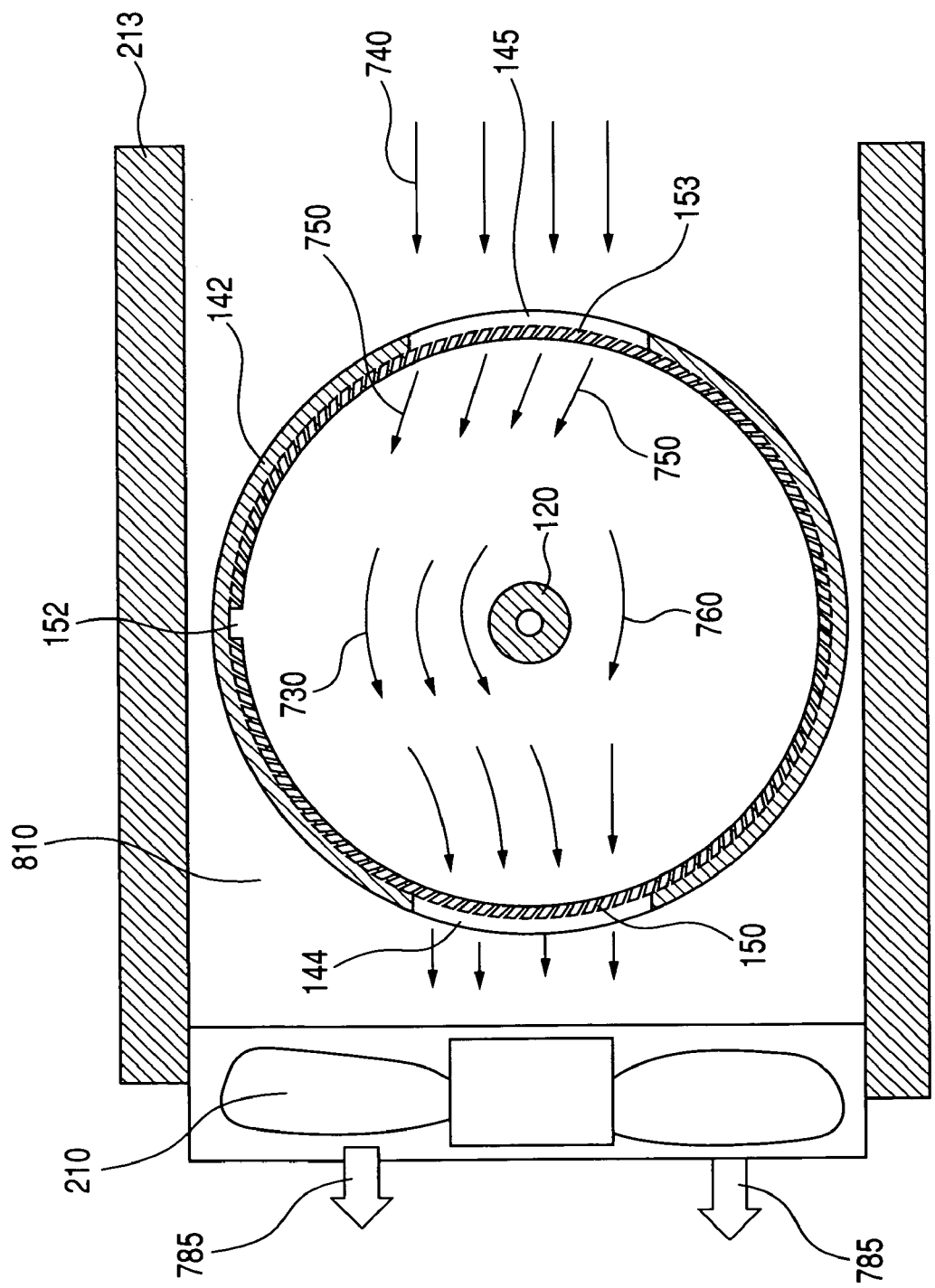
FIG. 8 is an explanatory diagram of the lighting means as seen from its front side in the image display device of the first embodiment.

FIG. 8 is an explanatory diagram of the mesh and the vicinity thereof in the lamp house according to the first embodiment illustrated in FIG. 1, as seen from the front side. In FIG. 8, the mesh 150 is represented on a larger scale for the purpose of explanation.

In FIG. 8, the lamp and the reflector are placed in a flow path 810 enclosed with the lamp duct 213. With operation of the fan 210, air flows through the interior of the reflector and around the reflector to cool the lamp. More specifically, upon operation of the fan 210, air flows in the direction of arrows 785 and the pressure in the flow path 810 which is a suction side of the fan becomes negative. In this state, the fine holes of the mesh 150 disposed within the connecting cylinder 142 which constitutes a part of the reflector in the lamp face obliquely and, are inclined upward from right to left in FIG. 8. That is, the air introduced from the intake hole 145 of the connecting cylinder 142 flows upward as represented by arrows 730.

The mesh 150 when seen in section is composed of fine inclined blades arranged in a large number. A detailed construction of the mesh will be described later with reference to FIGS. 9A, 9B and 9C. A schematic construction of blades 153 of the mesh 150 will now be described. For example, the thickness of a plate is 0.1 mm, the width thereof is 0.2 mm, the width of each fine hole is 1.25 mm, the height thereof is 0.7 mm, and an inclination angle of the plate is 35°. Under these conditions, the air passing through the mesh is deflected its flowing direction by the blades 153 due to the viscosity thereof and advances. The direction of the airflow can be controlled such that air originally flowing as represented by arrows 740 is deflected and caused to flow as represented by arrows 750 by allowing the air to pass through the mesh 150.

The air thus deflected by the mesh 150 then flows mainly above the lamp 120 as represented by arrows 730, whereby the upper portion of the lamp 120 can be mainly cooled.

On the other hand, the lamp 120 may sometimes vary in the amount of energy required for cooling between its upper and lower directions when emitting light. This is probably because of a difference in electrode size or a difference in glass plate thickness. To make the temperature in the vertical direction uniform to enhance reliability it is necessary to allow a larger amount of air to flow on the side where the temperature becomes high. The example of FIG. 8 shows a case where the upper side needs a larger amount of cooling energy. In this case, if air is allowed to flow uniformly on both upper and lower sides, the temperature on the upper side of the lamp 120 becomes higher about 30 degrees than the lower side. Such a great difference in temperature between the upper and lower sides of the lamp 120 causes deterioration in service life and reliability of the lamp 120. As shown in FIG. 8, if air is allowed to flow mainly above the lamp 120, the difference in temperature between the upper and lower sides of the lamp 120 becomes 10° or less for example. It is thus possible to ensure the service life and reliability of the lamp. Arrows indicated at 760 represent the direction of air flowing below the lamp 120.

Next, the details of the mesh 150 will be described below.

Figure 9A:
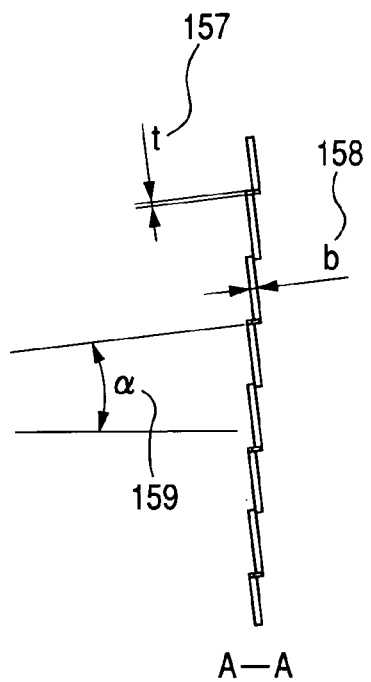
FIGS. 9A, 9B and 9C are explanatory diagrams of a mesh means used in the image display device of the first embodiment.
Figure 9B:
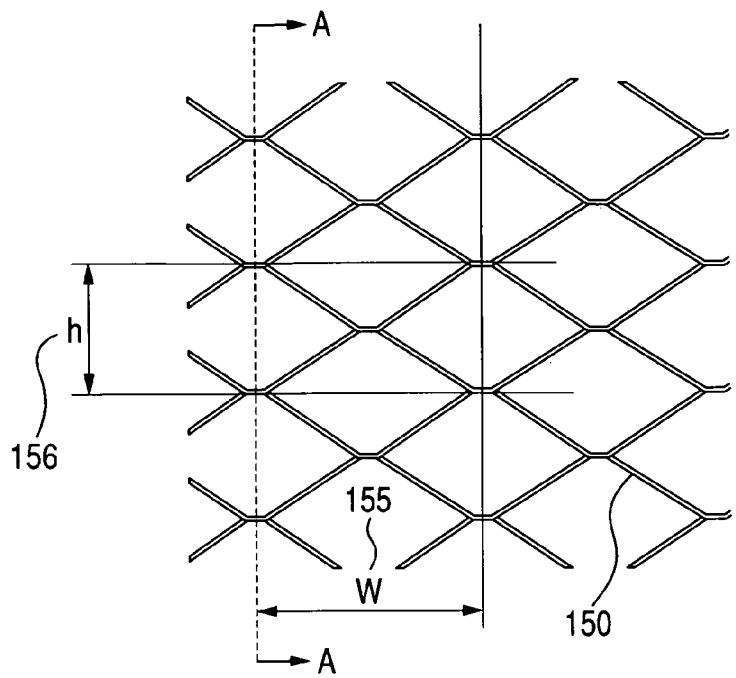
Figure 9C:
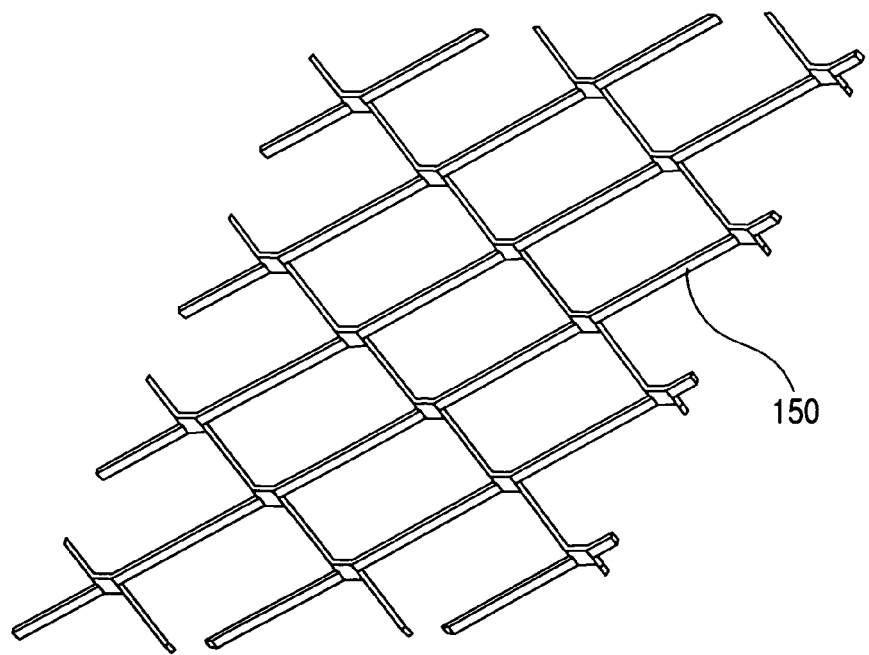

FIGS. 9A, 9B and 9C are enlarged diagrams showing the structure of the mesh 150 according to the first embodiment illustrated in FIG. 1. FIG. 9A is a transverse sectional view, FIG. 9B is a front view, and FIG. 9C is a sectional view taken along line A—A in FIG. 9B.

In this embodiment, the mesh 150 is formed of metallic mesh generally called expanded metal. As shown in FIG. 9C, an expanded metal plate is alternately perforated like dotted lines, then both ends of the metal plate are pulled to form a net-like mesh. The mesh 150 is constructed as follows: The original metal plate is cut to have a thickness of t 157 and intervals of a width of b 158 and eventually rhombic openings are formed at a lateral pitch (width) of W 155 and a vertical pitch (height) of h 156. In this case, as shown in the sectional view of FIG. 9A, for a portion indicated as the thickness t 157, a rhomb connection is configured to have two widths b 158 arranged side by side. If the metal plate is stretched vertically in FIG. 9B, the plate portion is inclined and provides a fine network structure having a predetermined angle such as an angle $\alpha$ 159. Given that the plate thickness t is 0.1 mm, the width b is 0.2 mm, the hole width W is 1.25 mm, and the hole height h is 0.7 mm, the inclination angle $\alpha$ is 35° for example.

In such an expanded metal structure inclined in the plate thickness direction relative to the entire mesh, a large number of very small inclined blades are arranged when seen in section. If air is applied perpendicularly to the mesh having a large number of very small inclined blades, the air undergoes friction with the very small blades and viscous resistance of air when passing between adjacent very small inclined blades and changes its flowing direction to the direction in which the blades face.

As a matter of course, since the expanded metal structure is a wire net structure having a large number of very small holes, it is possible to suppress the scattering of broken pieces of the lamp upon burst of the lamp.

As explained above with reference to FIGS. 1 to 9, by using the expanded metal structural member, both the function of controlling the direction of air to be blown to the lamp and the function of suppressing the scattering of broken pieces upon burst of the lamp can be attained at a time. Besides, since the two functions can be achieved simultaneously with use of a single member, not only rationalization can be attained but also the reduction of cost can result.

Moreover, to prevent the wire net from being mounted at an erroneous angle, there is adopted such a combination of the notch and lug as explained earlier in connection with FIG. 6, whereby the wire net is sure to be assembled in a predetermined angular direction.

Figure 10:
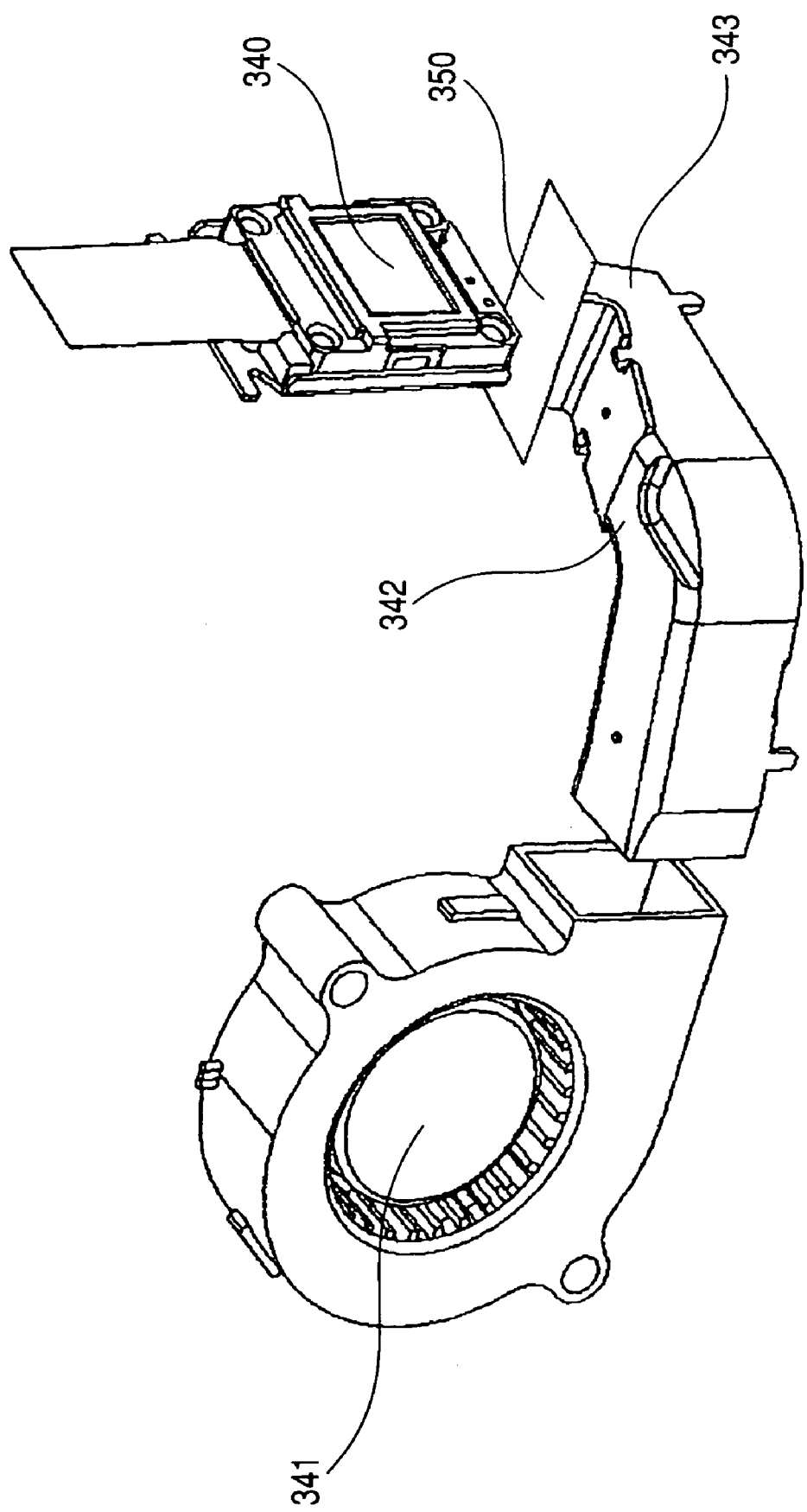
FIG. 10 is an explanatory diagram of a light valve cooling portion disposed in the interior of an image display device according to a second embodiment of the present invention.

FIG. 10 illustrates an image display device according to a second embodiment of the present invention.

In FIG. 10, cooling air is fed from a cooling air fan 341 through a duct 342 to a liquid crystal panel 340 which is a light valve means used in the image display device. A mesh 350 formed of an expanded metal structure member is disposed in a blow-off port 343 at a front end of the duct 342. If dust adheres to the liquid crystal panel 340, the dust is reflected in an enlarged projection image and therefore it is necessary to prevent the adhesion of dust. In this second embodiment, as shown in FIG. 10, the mesh 350 having very small holes is disposed in the blow-off port to prevent dust from getting out of the duct 342 and thereby prevent the adhesion of dust to the liquid crystal panel 340.

Figure 11:
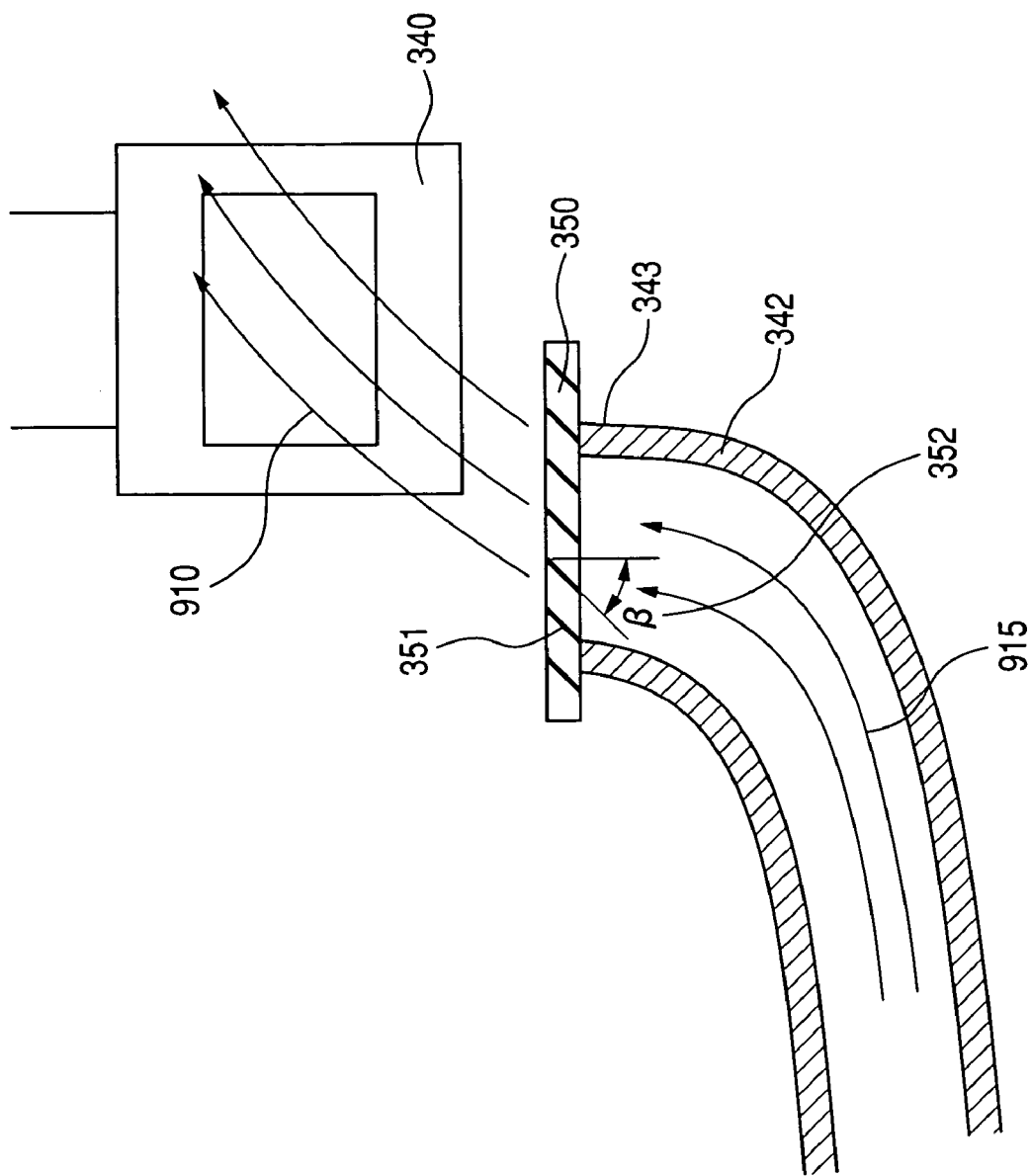
FIG. 11 is a detailed explanatory diagram of a cooling air guide plate disposed in the interior of the image display device of the second embodiment.

FIG. 11 illustrates a detailed operation of the second embodiment shown in FIG. 10.

In FIG. 11, the direction of air flowing out from the duct 342 as represented by arrows 915 is established by very small blades 351 which are inclined at an angle of β 352. The air having passing through the mesh 350 advances in a deflected fashion as represented by arrows 910 and strikes against the liquid crystal panel 340 at a predetermined angle. In this way it is possible to let cooling air strike against the liquid crystal panel at a predetermined angle. Thus, both the removal of duct and the control of air flowing direction can be done by a single mesh means. Besides, since such two objects can be achieved simultaneously by a single member, not only rationalization can be attained but also the reduction of cost can result.

Figure 12:
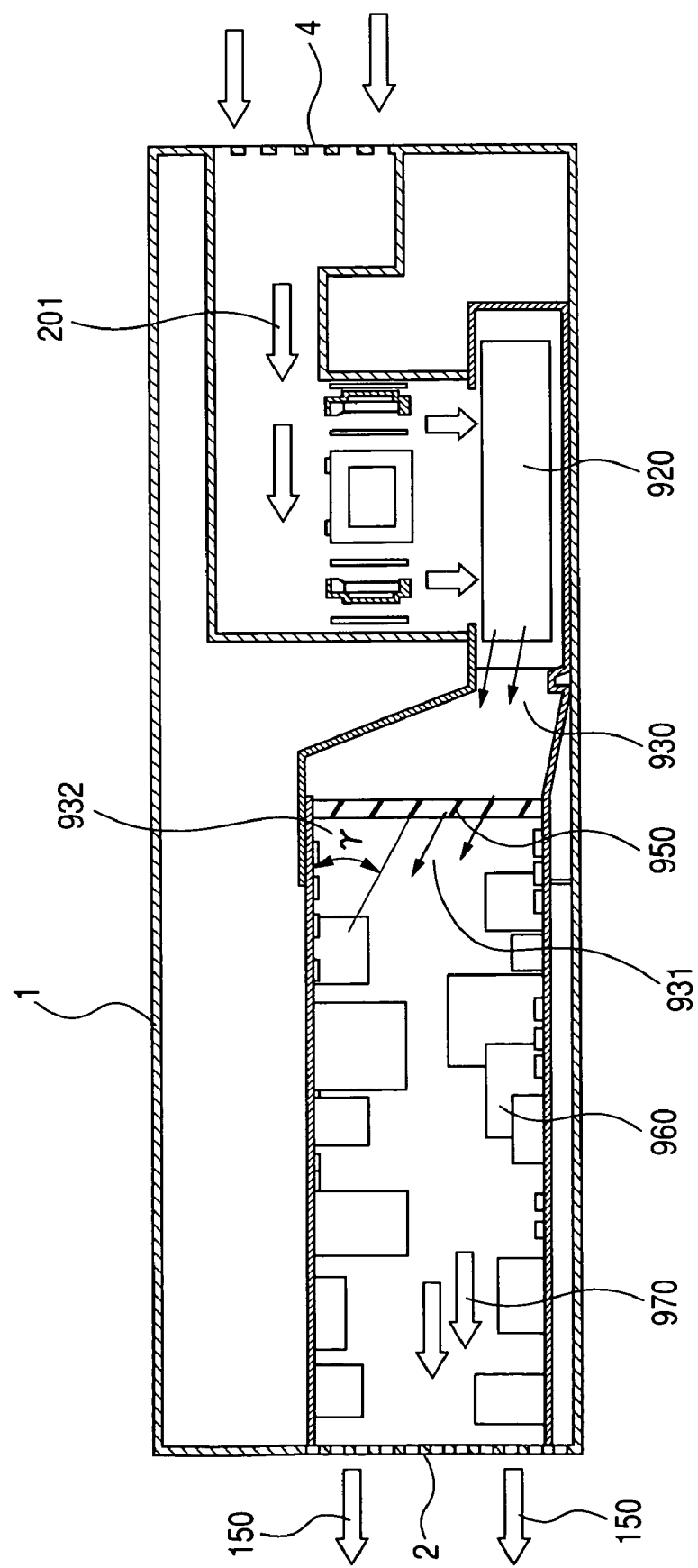
FIG. 12 is an explanatory diagram of a power supply cooling portion disposed in the interior of an image display device according to a third embodiment of the present invention.

FIG. 12 illustrates an image display device according to a third embodiment of the present invention.

In FIG. 12, a power supply means 960 is disposed on both upper and lower sides of the figure. Generally, the temperature is higher on the upper side than on the lower side and the temperature of each of upper side-disposed components of the power supply means has little temperature margin when viewed from the point of allowable temperature. To cool the power supply means 960, air is fed from a fan means 920 in the direction of arrows 931 through a mesh 950.

The mesh 950 formed of an expanded metal structural member is disposed in front of the power supply means 960. Air which has passed through the mesh 950 is deflected at a predetermined angle of γ 932 as represented by arrows 931 relative to the original flow indicated by arrows 930 and strikes against the power supply means 960. The mesh 950 has a large number of very small holes and a large number of air deflecting plates (blades) which are inclined at a predetermined angle. When the air fed from the fan means 20 passes through the mesh 950, dust is removed by the very small holes of the mesh. Consequently, the dust is not directly accumulated on the power supply means 960. Besides, the air flowing direction is controlled by the many deflecting plates (blades) inclined at a predetermined angle of the mesh 950 and thus the air can be directed to the power supply means 960 efficiently. Moreover, since two objects can be achieved by one member, it is possible to not only attain rationalization but also eventually attain the reduction in cost.

If the power supply means 960 disposed on upper and lower sides of FIG. 12 are both in a strict temperature condition, it goes without saying that the mesh 950 may be constituted by stacking two meshes one on another, one mesh comprising an upper air deflecting plate for directing air upward and the other mesh comprising a lower air deflecting plate for directing air downward.

The fan means 920 introduces the outside air from a panel intake port 4, forms an air flow path indicated by arrows 201 to cool optical components (e.g., liquid crystal panel, incidence-side polarizing plate, and exit-side polarizing plate) which are disposed halfway of the air flow path, then sucks the air after the cooling and discharges it as represented by arrows 930 to cool the power supply means 960. The air after cooling the power supply means 960 flows as represented by arrows 970 and is discharged from an exhaust port 2 as represented by arrows 970.

Although in the above embodiments an expanded metal is used to constitute the wire net, it goes without saying that the wire net can be constituted even by using another very small blade means, e.g., a honeycomb structure.

Further, although in the above embodiments the present invention is applied to an image display device, it goes without saying that the same effects as above can be obtained even if the present invention is applied to another electronic device, e.g., a computer.

In the image display device according to the present invention, as set forth above, two effects one of which is cooling the lamp as a lighting means and the vicinity thereof and the other of which is preventing the scatter of broken pieces upon burst of the lamp can be attained simultaneously by one simple wire net structure.

Thus, the present invention can provide the image display device having a high degree of reliability.

What is claimed is:

1. An image display device comprising:
   a lighting unit;
   a light valve which modulates illumination light emitted from said lighting unit;
   a display unit which displays the modulated light provided from said light valve;
   a cooling unit which cools said lighting unit; and
   a cooling air guide unit using a net of an expanded metal structure for directing cooling air from said cooling unit to the interior of said lighting unit,
   wherein said net of the expanded metal structure comprising a plurality of very small blades arranged and inclined at a predetermined angle relative to a cooling air guide path for said cooling air.

2. The image display device according to claim 1, wherein said net has a structure by which a mounting direction is recognized thereof.

3. An image display device comprising:
   a cooling fan which cools the interior of the image display device; and
   a cooling air guide unit which directs cooling air from said cooling fan to a predetermined unit disposed in the interior of the image display device;
   wherein said cooling air guide unit is constituted by a net of an expanded metal structure,
   wherein said net of the expanded metal structure is constituted by a plurality of very small blades arranged and inclined at a predetermined angle relative to a cooling air guide path for said cooling air.

4. The image display device according to claim 3, wherein said net has a structure by which a mounting direction is recognized thereof.

* * * * *